(12) United States Patent
Fries

(10) Patent No.: US 11,836,787 B2
(45) Date of Patent: *Dec. 5, 2023

(54) SYSTEMS AND METHODS FOR TRANSIENT LOCAL COMMERCE SEARCH

(71) Applicant: eBay Inc., San Jose, CA (US)

(72) Inventor: Kevin Patrick Fries, Granite Bay, CA (US)

(73) Assignee: EBAY INC., San Jose, CA (US)

(*) Notice: Subject to any disclaimer, the term of this patent is extended or adjusted under 35 U.S.C. 154(b) by 325 days.

This patent is subject to a terminal disclaimer.

(21) Appl. No.: 17/147,026

(22) Filed: Jan. 12, 2021

(65) Prior Publication Data

US 2021/0209673 A1    Jul. 8, 2021

Related U.S. Application Data

(63) Continuation of application No. 16/159,938, filed on Oct. 15, 2018, now Pat. No. 10,915,944, which is a continuation of application No. 13/670,146, filed on Nov. 6, 2012, now Pat. No. 10,127,602.

(51) Int. Cl.
*G06Q 30/00* (2023.01)
*G06Q 30/0601* (2023.01)

(52) U.S. Cl.
CPC .............. *G06Q 30/0639* (2013.01)

(58) Field of Classification Search
CPC ............................................. G06Q 30/06–08
See application file for complete search history.

(56) References Cited

U.S. PATENT DOCUMENTS

| 7,849,079 | B2 | 12/2010 | Chandrasekar et al. |
| 10,127,602 | B2 * | 11/2018 | Fries ............... G06Q 30/0639 |
| 10,915,944 | B2 * | 2/2021 | Fries ............... G06Q 30/0639 |
| 2007/0220123 | A1 | 9/2007 | Agrawal |
| 2011/0243553 | A1 | 10/2011 | Russell |
| 2012/0179561 | A1 * | 7/2012 | Sun .................... G09B 29/10 |
| | | | 715/234 |
| 2013/0027227 | A1 * | 1/2013 | Nordstrom ......... G01C 21/3438 |
| | | | 340/990 |
| 2014/0129381 | A1 | 5/2014 | Fries |
| 2019/0050937 | A1 | 2/2019 | Fries |

OTHER PUBLICATIONS

Notice Of Allowance received for U.S. Appl. No. 16/159,938, dated Oct. 5, 2020, 5 pages.
Appeal Decision received for U.S. Appl. No. 13/670, 146, dated Apr. 23, 2018, 14 pages.

(Continued)

*Primary Examiner* — Ethan D Civan
(74) *Attorney, Agent, or Firm* — SCHWEGMAN LUNDBERG & WOESSNER, P.A.

(57) ABSTRACT

A system, computer-readable storage medium storing at least one program, and computer-implemented method for a transient local commerce search service is provided. A search query including a user specified location and a user specified time period is received. One or more transient merchants temporarily located within the user specified location at least during the user specified time period are identified. A user interface displaying a map and an indicator of temporary location of the one or more transient merchants is displayed.

17 Claims, 6 Drawing Sheets

(56) References Cited

OTHER PUBLICATIONS

Examiner's Answer to Appeal Brief received for U.S. Appl. No. 13/670, 146, dated Jul. 22, 2016, 15 pages.
Final Office Action received for U.S. Appl. No. 13/670, 146, dated May 12, 2015, 6 pages.
Non-Final Office Action received for U.S. Appl. No. 13/670, 146, dated Nov. 19, 2014, 10 pages.
Notice of Allowance received for U.S. Appl. No. 13/670, 146, dated Jul. 13, 2018, 8 pages.
Non Final Office Action Received for U.S. Appl. No. 16/159,938, dated Jun. 25, 2020, 7 pages.

* cited by examiner

SYSTEMS AND METHODS FOR TRANSIENT LOCAL COMMERCE SEARCH

PRIORITY CLAIM

This application is a continuation of and claims the benefit of priority to U.S. application Ser. No. 16/159,938, filed Oct. 15, 2018, which is a continuation of and claims the benefit of priority to U.S. application Ser. No. 13/670,146, filed on Nov. 6, 2012, each of which is hereby incorporated by reference in its entirety.

TECHNICAL FIELD

This application relates generally to data processing within a network-based system, and more specifically to systems and methods to provide transient local commerce search capabilities.

BACKGROUND

Local search websites allow a user to search for products or services within specified distances from their location. Such websites are limited to providing search results for only those merchants with a permanent physical location and operating during specified period of operation.

BRIEF DESCRIPTION OF THE DRAWINGS

Some embodiments are illustrated by way of example and not limitation in the figures of the accompanying drawings in which.

DETAILED DESCRIPTION

Figure 1:
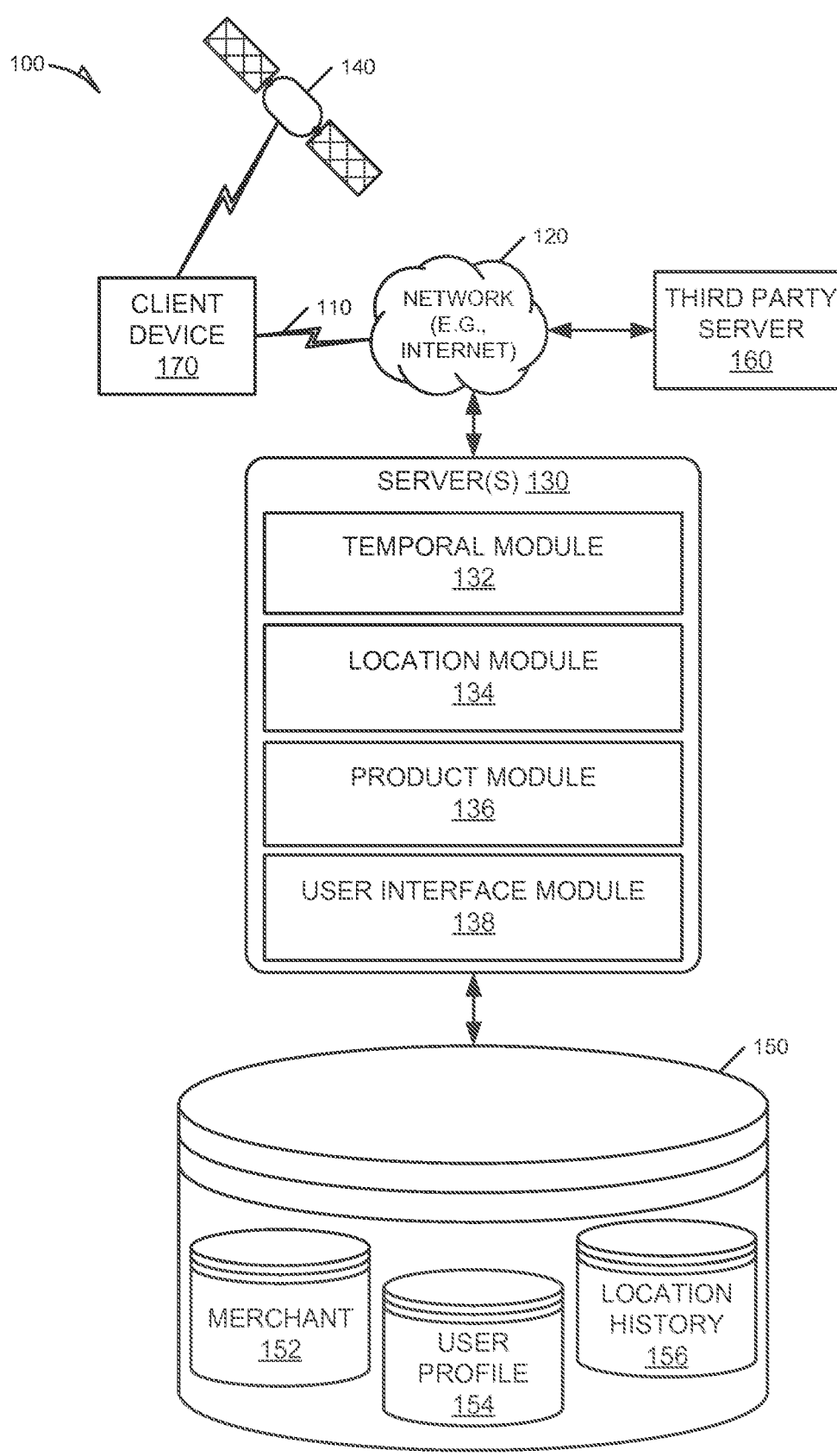
FIG. 1 is a block diagram illustrating a network-based system for delivering transient local commerce search processes, according to an example embodiment.

Reference will now be made in detail to specific embodiments including the best modes contemplated by the inventors for carrying out the invention. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, the components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Transient merchants who do not have a permanent geographical location, such as mobile food vendors, are often omitted from typical search results for inventory available at local merchants. In some instances, the schedules and routes of transient merchants may be too inconsistent or complicated for inclusion in search results of a traditional local search website.

A user who wishes to purchase a particular product offered by a transient merchant must either rely upon the happenstance of the transient merchant being within the user's area, or the user must partake in the arduous process of locating information for transient merchants from websites, blogs or social networks in the hope of locating a merchant near the user. Such methods are typically ineffective due to the unlikelihood of a particular transient merchant being in the area and the difficulty in locating accurate information as to the whereabouts of the transient merchants.

In an example embodiment, a user may perform a search query for a particular product having a limited availability in both time and geographic location. Accordingly, the user may provide information to narrow search results based on the time and location a user desires to purchase a particular product. In one example embodiment, the user is provided with a list of results for products that are similar to what the user has described and that are available within a location and time specified by the user. In another embodiment, the search results are presented to the user in a map that indicates the location of each result.

In one embodiment, products for which a user can search are of a limited availability in both time and geographic location because the products are only offered by transient merchants. Transient merchants are those merchants whose place of business are not the traditional brick and mortar permanent locations, but instead a mobile business or one whose location is only seasonally or temporarily fixed. For example, a transient merchant may be a mobile taco vendor that parks near a certain intersection only during business hours on Mondays and Tuesdays. In another example, the transient merchant may be a vendor at a farmer's market that only operates on Friday afternoons in the summer.

In one embodiment, the user may narrow the search for a particular product available within a specified distance from the current location of the user at a specified time. In this embodiment, the user's location is retrieved from the mobile device of the user and search results are narrowed accordingly. For example, a user may search for "tacos with crab meat" available "now" within three blocks of the user's current location. In this example, the system may provide results for a taco truck currently serving tacos with crab meat at a location that is within three blocks of the user. In another embodiment, the user may specify a future anticipated location for which the user desires to determine the availability of a particular product within a specified distance of the user's future anticipated location at a specified time. For example, a user may search for "clam chowder" available near "Financial District of San Francisco" in "3 hours". In this example, the system will return all results for merchants offering clam chowder three hours from the time of the user's query within the financial district.

In one embodiment, a user may limit the product search to only those products available to the user at the time of the query. In other embodiments, the user may specify the time of availability as an approximate time (e.g., "at lunch"), an approximate date (e.g., "about two weeks from today"), a time range (e.g., "between 12:30 a.m. and 2:00 a.m."), a date range (e.g., "between Oct. 3, 2012 and Oct. 8, 2012"), an exact time (e.g., "at 1:35 p.m."), or an exact date (e.g., "on Aug. 16, 2013").

In one embodiment, information regarding the availability of a particular product is retrieved from a database of product information. In this embodiment, each transient merchant provides the database with the details of the availability for each product it carries, including details of the time and geographic location the transient merchant will offer the product. In another embodiment, information regarding the availability of a particular product is retrieved and aggregated from websites, blogs and social network pages by a web crawler.

Example System

FIG. 1 is a block diagram illustrating an environment 100 for delivering augmented reality features to a mobile device, according to an example embodiment. The environment 100 may include a client device 170, a communication connection 110, a communication network 120, servers 130, a communication satellite 140, a third party server 160, and a database 150. The servers 130 can optionally include temporal module 132, location module 134, product module 136, and a user interface module 138. The database 150 can optionally include merchant databases 152, user profile database 154, and/or location history database 156. The client device 170 represents one example device that can be utilized by a user to perform a transient local commerce search. The client device 170 may be any of a variety of types of devices (for example, a cellular telephone, a personal digital assistant (PDA), a Personal Navigation Device (PND), a handheld computer, a tablet computer, a notebook computer, or other type of movable device). The client device 170 may interface via a connection 110 with a communication network 120 (e.g., the Internet or WAN). Depending on the form of the client device 170, any of a variety of types of connections 110 and communication networks 120 may be used.

For example, the connection 110 may be Code Division Multiple Access (CDMA) connection, a Global System for Mobile communications (GSM) connection, or other type of cellular connection. Such connection 110 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 120 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or to other types of networks).

In another example, the connection 110 may be Wireless Fidelity (Wi-Fi, IEEE 802.11x type) connection, a Worldwide Interoperability for Microwave Access (WiMAX) connection, or another type of wireless data connection. In such an embodiment, the communication network 120 may include one or more wireless access points coupled to a local area network (LAN), a wide area network (WAN), the Internet, or other packet-switched data network.

In yet another example, the connection 110 may be a wired connection, for example an Ethernet link, and the communication network may be a LAN, a WAN, the Internet, or other packet-switched data network. Accordingly, a variety of different configurations are expressly contemplated.

An Application Programming Interface (API) server (not shown) and a web server (not shown) are coupled to, and provide programmatic and web interfaces respectively to, a plurality of servers 130. The plurality of servers 130 may be coupled via these interfaces to the communication network 120, for example, via wired or wireless interfaces. The plurality of servers 130 are, in turn, shown to be coupled to one or more database servers that facilitate access to one or more databases 150. In some examples, the plurality of servers 130 can access the databases 150 directly without the need for a database server.

Further, while the system 100 shown in FIG. 1 employs a client-server architecture, the present invention is of course not limited to such an architecture, and could equally well find application in a distributed, or peer-to-peer, architecture system, for example. The various modules of the plurality of servers 130 may also be implemented as standalone systems or software programs, which do not necessarily have networking capabilities.

As illustrated in FIG. 1, the plurality of servers 130 may include one or more temporal modules 132. The temporal module 132 may be a hardware implemented module or software executed by general purpose or special purpose hardware or instructions stored on a computer readable medium that is operable to receive temporal data indicating when a particular product is available by a merchant. In one embodiment, the temporal data may be received from merchant database 152. In another embodiment, the temporal data may be received from a website of the merchant, a blog of the merchant, or a social network profile of the merchant residing on third party server 160 via a web crawler. In yet another embodiment, the temporal data may be inferred from information received from the location history database 156. The temporal module may then communicate the temporal data to location module 134 and product module 136 to provide further transient local commerce searching services to a user of client device 170.

As illustrated in FIG. 1, the plurality of servers 130 may include one or more location modules 134. The location module 134 may be a hardware implemented module or software or instructions stored on a computer readable medium that is operable to receive location data indicating a location of a merchant having a particular product. For the purposes of this specification and the associated claims, the term "location" is used to refer to a geographic location, such as a longitude/latitude combination or a street address. Consistent with embodiments of the present disclosure, the location data may identify a temporary physical location of a transient merchant. For purposes of this specification and the associated claims, the term "transient merchant" refers to a merchant whose place of business is not a traditional brick and mortar permanent location having set hours consistently throughout the year, but instead a mobile business or one whose location is only temporarily or seasonally fixed. Further, the term "temporary location" shall refer to any location at which a transient merchant provides products or services for sale, regardless of the time spent in that location or any other location.

In one embodiment, the location module 134 may receive location data from merchant database 152. In another embodiment, the location data may be received from a website of the merchant, a blog of the merchant, or a social network profile of the merchant residing on third party server 160 via a web crawler. In yet another embodiment, the location data may be inferred from information received from the location history database 156. The temporal module 132 may then communicate the location data to product module 136 to provide further transient local commerce searching services to a user of client device 170.

As illustrated in FIG. 1, the plurality of servers 130 may include one or more product modules 136. The product module 136 may be a hardware implemented module or software or instructions stored on a computer readable medium that is operable to receive a particular product, a period of time and a location specified by a user of client device 170 at a user interface provided by user interface module 138. The product module 136 is further operable to determine that the particular product is available within at the specified location during the specified period of time. The product module 136 may use the temporal data and location data received from the temporal module 132 and location module, respectively, to identify at least one merchant providing the particular product within the specified location during the specified period of time. The product module 136 may then provide a list of results, including the at least one merchant, to the user interface module 138 to be displayed on client device 170.

In one embodiment, the product module 136 may determine that a particular product is not available in the specified location during the specified time. In this embodiment, the product module 136 may provide the user interface module 138 with a list of merchants having products that are similar to the particular product for which a user is searching. For example, a user may search for "pumpkin spice lattes" within a specified distance from the user's current location. In this example, the product module 136 may determine that "pumpkin spice lattes" are not available at that time within the specified location. In this example, the product module 136 may instead provide results for multiple merchants serving "gingerbread lattes". In other embodiments, the product module 136 may use information from user profile database 154 to determine other products that the user may also be interested in that are similar in nature to the particular product. For example, a user may search for "grilled cheese" within a specified distance from the user's current location. In this example, the product module 136 may determine that "grilled cheese" is not available at that time within the specified location. Following along with this example, the product module 136 may provide results for "bacon cheeseburgers" based on the user having previously searched for "bacon cheeseburgers" a pre-determined number of times.

In another embodiment, the product module 136 may determine that a particular product is available at a particular location, but not at the specified time. Consistent with this embodiment, the product module 136 may provide the user interface module 138 with a list of merchants providing the particular product at the particular location at a time other than that specified by the user. For example, a user may search for "eggnog milkshakes" available on "October 30" within a specified distance from the user's location. In this example, the product module 136 may determine that "eggnog milkshakes" are not available until "November 1". In this example, the product module 136 may instead provide the user with results for merchants offering "eggnog milkshakes" on "November 1" within the specified distance from the user's location.

In yet another embodiment, the product module 136 may determine that a particular product available at the specified time, but not within the particular location provided by the user. Consistent with this embodiment, the product module 136 may provide the user interface module 138 with a list of merchants providing the particular product at the specified time near the particular location. For example, a user may search for "savory crepes with brie" available a "noon" within "1 mile" from the user's current location. In this example, the product module 136 may determine that "savory crepes with brie" are available at "noon" at a distance that is beyond "1 mile" from the user's current location. In this example, the product module 136 may instead provide the user with results for merchants offering "savory crepes with brie" at "noon" that are beyond "1 mile" of the user's current location.

In another embodiment, the product module 136 may determine that a user's search includes a generic term instead of a particular product. In this embodiment, the product module 136 may provide the user interface module 138 with a list of all of the merchants providing products that fit the user's generic query term. For example, a user may search for "lunch specials" at a specified time and at a specified location from the user's location. In this example, the product module 136 may provide the user interface module 138 with a list of merchants having "lunch specials" at the specified time and within the specified location.

As illustrated in FIG. 1, server(s) 130 may also include a user interface module (e.g., a web server) 138, which receives requests from various client-computing devices, and communicates appropriate responses to the requesting client devices. For example, the user interface module(s) may receive requests in the form of Hypertext Transport Protocol (HTTP) requests, or other web-based, application programming interface (API) requests. The client device 170 may be executing conventional web browser applications, or applications that have been developed for a specific platform to include any of a wide variety of mobile devices and operating systems.

As illustrated in FIG. 1, the database 150 can optionally include merchant databases 152, user profile database 154, and/or location history database 156. Merchant databases 152 may include information about a plurality of merchants. This information may, for example, include descriptions or identifiers of the products or services offered by a merchant, availability of products (e.g., the merchants stock), a listing of times or dates in which certain products are available, locations the merchant visits, and an anticipated schedule of the merchant. In one embodiment, this information is provided to the merchant database 152 directly by the merchant. In other embodiments, this information is received from a website of the merchant, a blog of the merchant, or a social network profile of the merchant residing on third party server 160 via a web crawler.

User profile database 154 may store general information about a user contained in a profile of an online website (e.g., social networks, online merchants, user review or local search websites) including general contact information, employer information, educational institution information, as well as information concerning various online or offline groups. Consistent with some embodiments, when a user initially registers to become a member of an online website, the user may be prompted to initially provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the user profile database 154. User profile database 154 may also store information store historical information corresponding to the user including, for example, purchase history, a history of products the user searched for, or reviews posted by the user for products or merchants.

Location history database 156 may store a history of locations visited by a particular merchant. In one embodiment, this information may be received directly from a merchant. In another embodiment, location history information may be received from a website of the merchant, a blog of the merchant, or a social network profile of the merchant residing on third party server 160 via a web crawler. In yet another embodiment, location information may be received by users who have knowledge of a merchant's visit to a particular location.

FIG. 1 also illustrates a third party server 160 as having programmatic access to the network 120. The third party server may be coupled via the API server to the communication network 120, for example, via wired or wireless interfaces. For example, the third party server 160 may, utilizing information retrieved from the communication network 120, support one or more features or functions on a website hosted by the third party. The third party website may, for example, be a merchant website that may provide one or more functions that are supported by the relevant applications of the network system 100.

Example Methods

Figure 2:
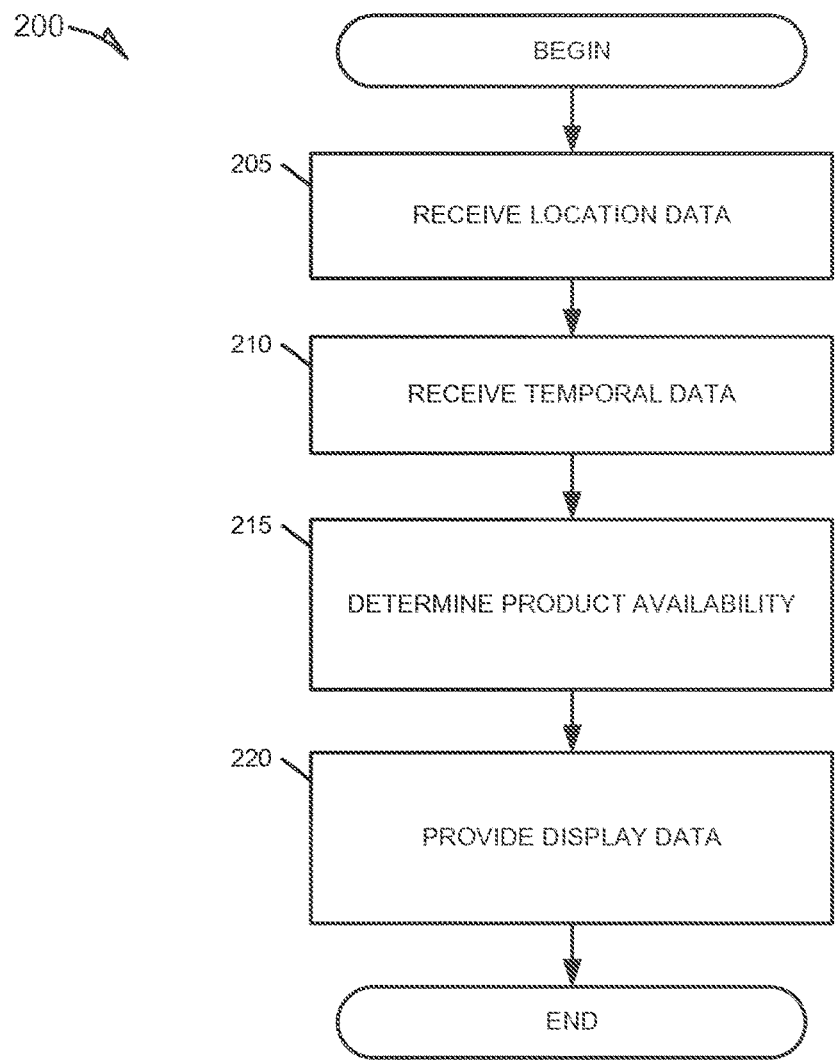
FIG. 2 flowchart illustrating a method for providing a local transient commerce search, according to an example embodiment.

FIG. 2 flowchart illustrating method 200 for providing a local transient commerce search, according to an example embodiment. At block 205, the location module 134 may receive location data identifying a temporary geographic location of a merchant having a particular product available for sale.

At block 210, the temporal module 134 may receive temporal data indicating a specified time when the particular product is available at the temporary location of the merchant identified by the location data. At block 215, the product module 136 determines that the particular product is available within a specified location and at the specified period of time. In another embodiment, the product module 136 may determine that the particular product is not available within the specified location and at the specified period of time. In this embodiment, the product module 136 may instead determine that a similar product is available within the specified period of time.

At block 220, display data is provided to the client device 170 to display at least one merchant providing the particular product within the geographic location and at the specified period of time.

Example User Interfaces

Figure 3:
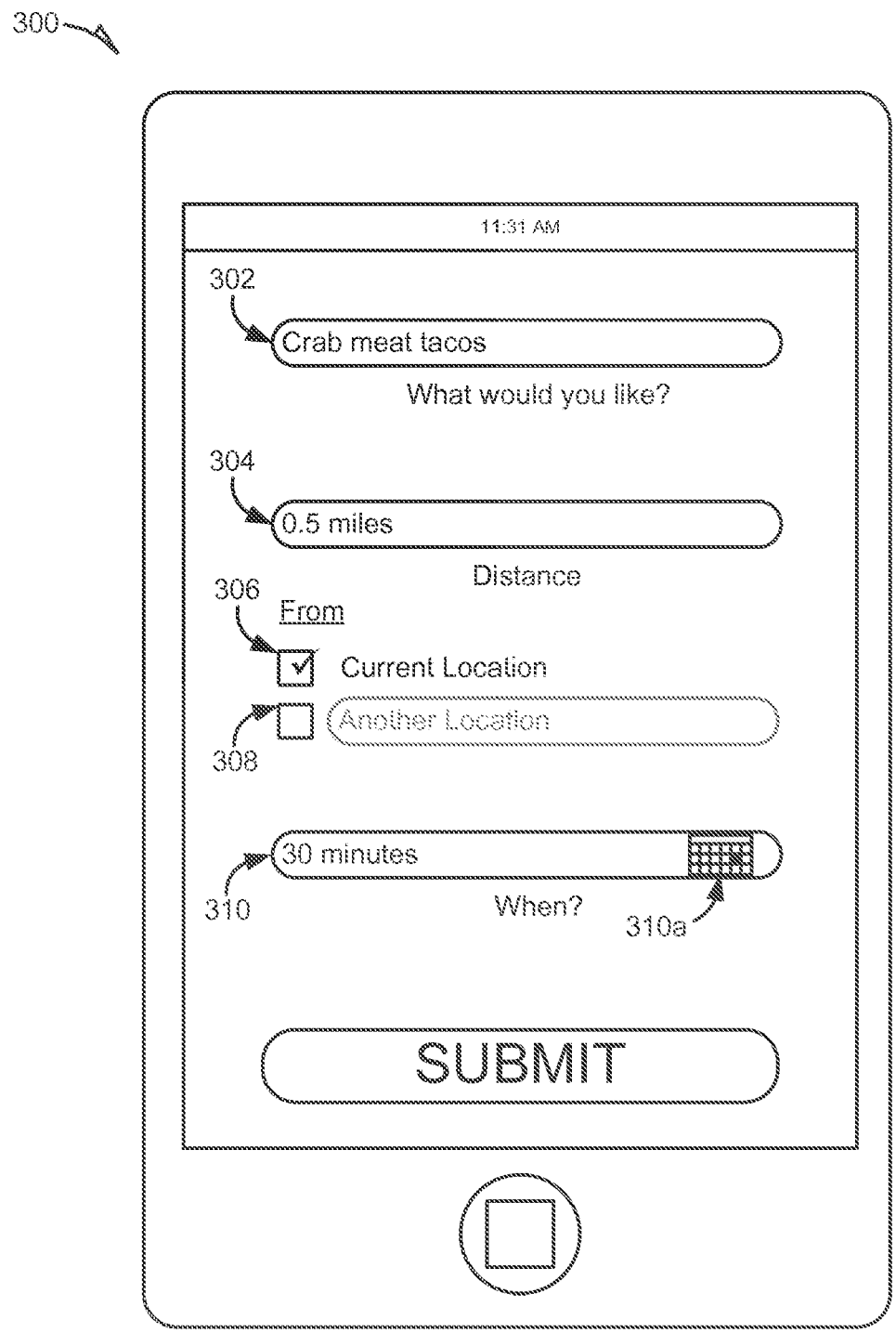
FIG. 3 is an interface diagram illustrating a portion of an example user interface displaying a transient local commerce search query, according to an example embodiment.

FIG. 3 is an interface diagram illustrating a portion of an example user interface 300 displaying a transient local commerce search query, according to an example embodiment. User interface 300 includes input field 302, which receives an input from a user of client device 170 describing a desired product. The particular product may be any product having a limited availability in both time and location. In this example, the user has identified "tacos with crab meat" as the product the user wishes to locate.

As illustrated in FIG. 3, user interface 300 also includes input field 304, which receives an input from the user of the client device specifying a location within which the user wishes to locate the particular product. In this example, the user has input the location as a specified distance from the user current location, as indicated by check box 306. Specifically, the user in this example interface has indicated that the particular product (e.g., "tacos with crab meat") is to be located within "0.5 miles" of the user's location. Although, in this example the user has input the specified distance in as a unit of measurement of the English system of measurement, it should be appreciated by those skilled in the art that the distance may be input as any standard unit of measurement.

Furthermore, in this example the user has provided the location as a specified distance from the user's current location, however, in other embodiments the location may be provided as an anticipated location. In this embodiment, the user may instead select check box 308 and provide the name of a location in which the user intends to locate a particular product. In this embodiment, the anticipated location may, for example, be entered as an address (e.g., "25 S. Third St."), a city name (e.g., "San Francisco, CA"), a place name (e.g., "Golden Gate Park"), or a metropolitan district or neighborhood (e.g., "San Francisco Financial District").

As illustrated in FIG. 3, user interface 300 also includes data entry field 310, which receives an input from a user of client device 170 identifying a time of availability in which the user intends to locate a particular product. In this example, the user has indicated that the particular product for which the user is searching must be available within "30 minutes". Data entry field 310 may optionally include a date selector 310*a*. The date selector 310*a* may provide the user with the ability to select a specific date from a calendar interface. In other embodiments, the user may specify the time of availability as an approximate time (e.g., "at lunch"), an approximate date (e.g., "about two weeks from today"), a time range (e.g., "between 12:30 a.m. and 2:00 a.m."), a date range (e.g., "between Oct. 3, 2012 and Oct. 8, 2012"), an exact time (e.g., "at 1:35 p.m."), or an exact date (e.g., "on Aug. 16, 2013").

Figure 4:
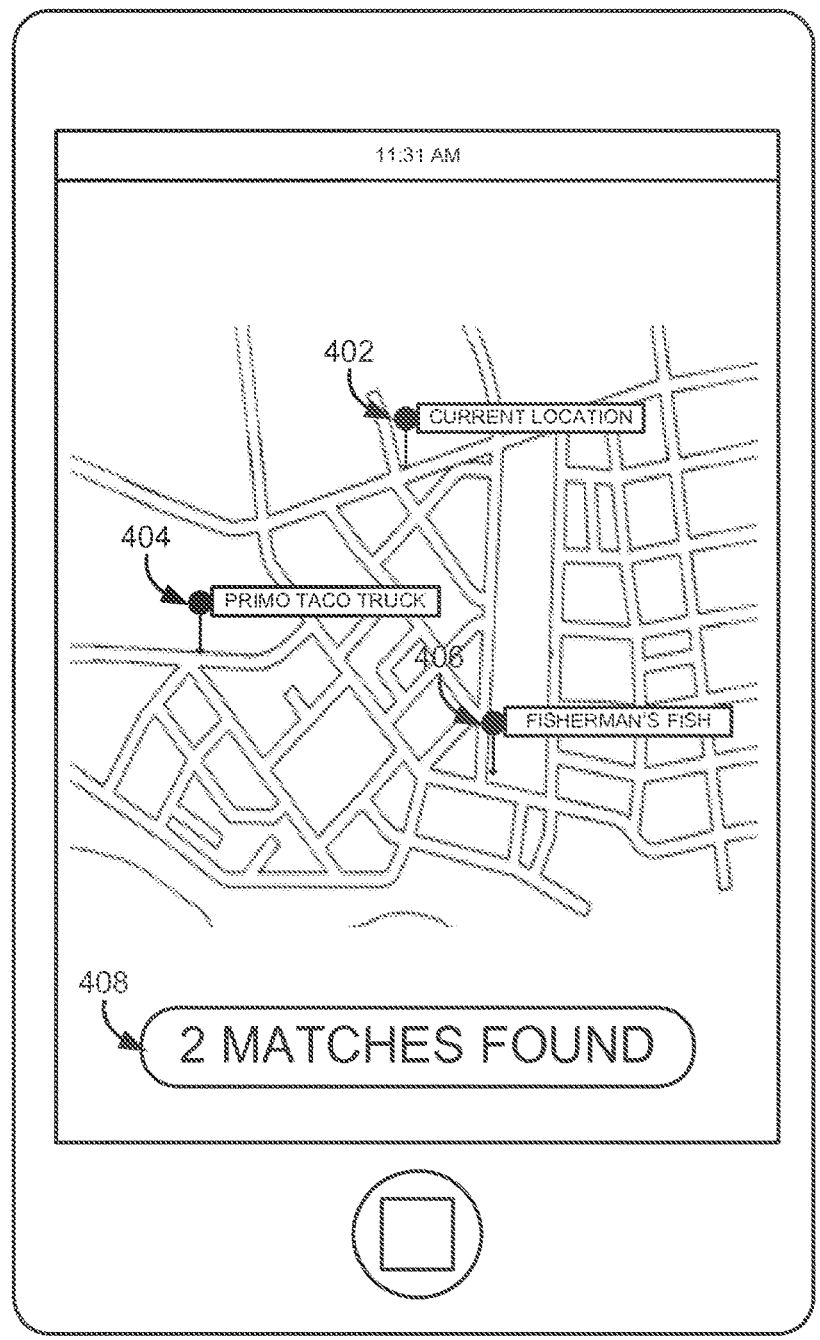
FIG. 4 is an interface diagram illustrating a portion of an example user interface displaying transient local commerce search results, according to an example embodiment.

FIG. 4 is an interface diagram illustrating an example user interface 400 displaying transient local commerce search results, according to an example embodiment. User interface 400 provides results according to the particular product, time of availability, and location of availability specified by the user in user interface 300. As illustrated in FIG. 4, user interface 400 displays a map including drop pins 402, 404 and 406. Drop pin 402 indicates the user's location. Drop pin 404 indicates merchant having a matching product for the product in the query submitted by the user at interface 300. Drop pin 406 indicates a merchant having a similar product to the product in the query submitted by the user at interface 300. As illustrated in FIG. 4, user interface 400 also includes indicator 408, which provides a user with an indication of the number of matching merchants which provide the particular product at the specified time and at the location specified by the user. In other embodiments, the results may be provided to the user as a textual listing of results.

Example Mobile Device

Figure 5:
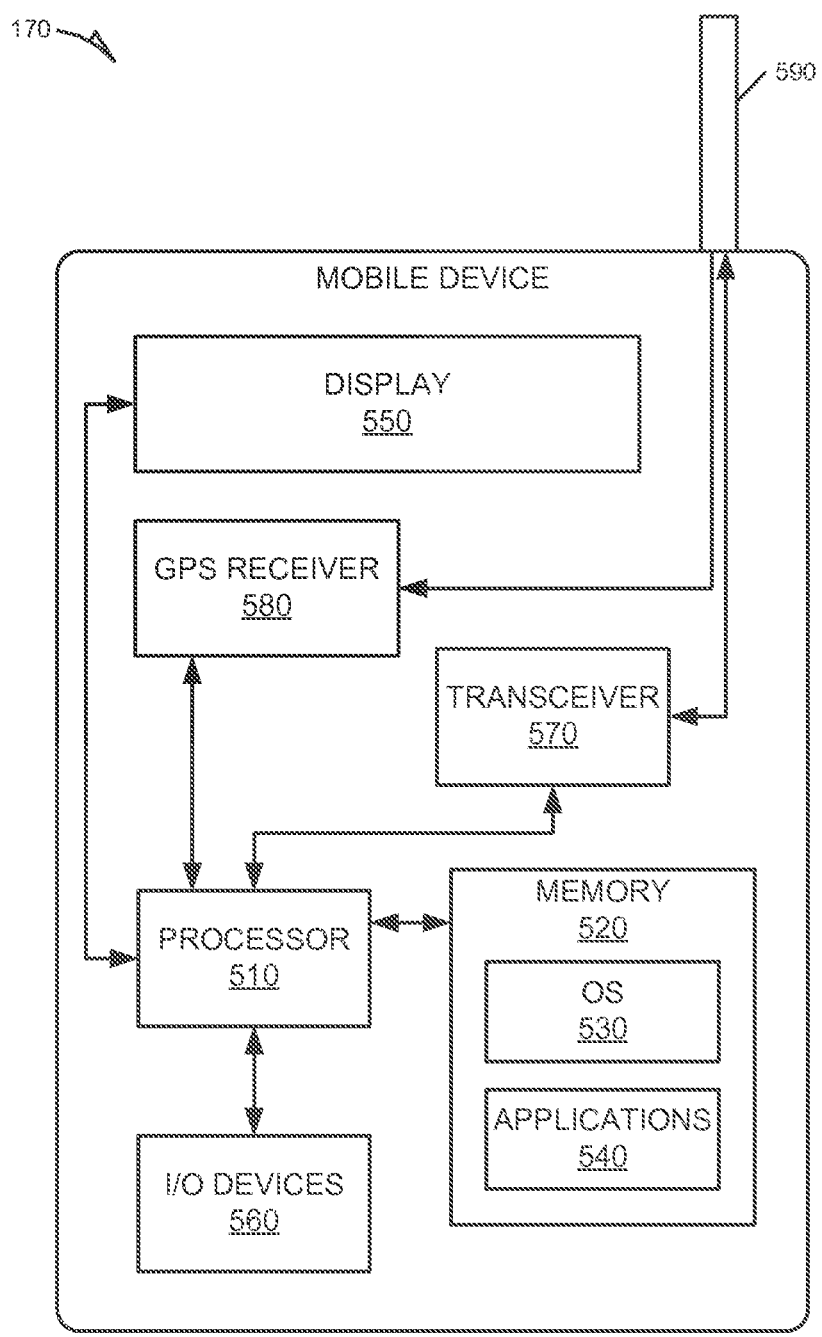
FIG. 5 is a block diagram illustrating a mobile device, according to an example embodiment.

FIG. 5 is a block diagram illustrating a mobile device, according to an example embodiment. The mobile device 170 may include a processor 510. The processor 510 may be any of a variety of different types of commercially available processors suitable for mobile devices (for example, an XScale architecture microprocessor, a Microprocessor without Interlocked Pipeline Stages (MIPS) architecture processor, or another type of processor). A memory 520, such as a Random Access Memory (RAM), a Flash memory, or other type of memory, is typically accessible to the processor. The memory 520 may be adapted to store an operating system (OS) 530, as well as application programs 540, such as a mobile location enabled application that may provide LBSs to a user. The processor 510 may be coupled, either directly or via appropriate intermediary hardware, to a display 550 and to one or more input/output (I/O) devices 560, such as a keypad, a touch panel sensor, a microphone, and the like. Similarly, in some embodiments, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 170. In this manner, the connection 110 with the communication network 120 may be established. Further, in some configurations, a GPS receiver 580 may also make use of the antenna 590 to receive GPS signals Modules, Components and Logic Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
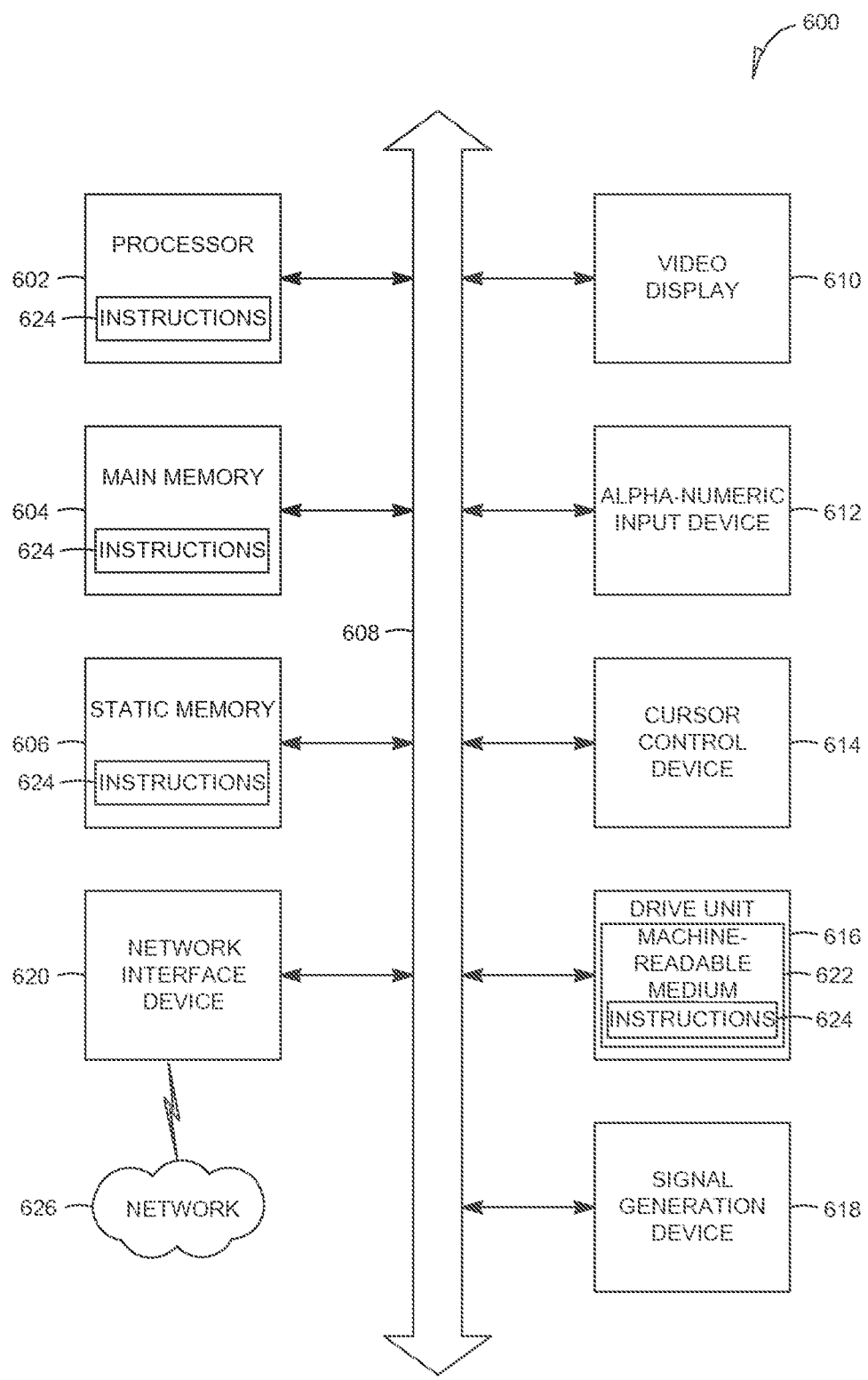
FIG. 6 is a diagrammatic representation of a machine in the example form of a computer system within which a set of instructions for causing the machine to perform any one or more of the methodologies discussed herein may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or used by any one or more of the methodologies or functions described herein. The instructions 624 may also reside, completely or at least partially, within the main memory 604, static memory 606, and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a search query from a client device, the search query including a user specified location and a user specified time period, the search query being submitted via a first user interface presented on the client device;
   identifying a transient merchant temporarily located within the user specified location at least during the user specified time period; and
   causing the client device to display a second user interface in response to receiving the search query submitted via the first user interface, the second user interface including:
      an indicator displayed in conjunction with a map, the indicator indicating a temporary location of the transient merchant, the transient merchant being temporarily located within the user specified location during the user specified time period; and
      an indication of a number of matching different transient merchants where each of the matching different transient merchants are within a threshold distance of the user specified location.

2. The method of claim 1, wherein the user specified location is a specified distance from a current geographic location of the user.

3. The method of claim 1, wherein the transient merchant provides a geographic location at which the transient merchant will offer a product, and wherein the geographic location corresponds to the user specified location.

4. The method of claim 1, wherein the search query includes a particular product.

5. The method of claim 1, wherein the transient merchant is a food truck.

6. The method of claim 1, wherein the transient merchant is capable of changing locations after a given time period.

7. A system comprising:
   a memory; and
   one or more processors configured to perform operations comprising:
      receiving a search query from a client device, the search query including a user specified location and a user specified time period, the search query being submitted via a first user interface presented on the client device;
      identifying a transient merchant temporarily located within the user specified location at least during the user specified time period; and
      causing the client device to display a second user interface in response to receiving the search query submitted via the first user interface, the second user interface including:
         an indicator displayed in conjunction with a map, the indicator indicating a temporary location of the transient merchant, the transient merchant being temporarily located within the user specified location during the user specified time period; and
         an indication of a number of matching different transient merchants where each of the matching different transient merchants are within a threshold distance of the user specified location.

8. The system of claim 7, wherein the user specified location is a specified distance from a current geographic location of the user.

9. The system of claim 7, wherein the transient merchant provides a geographic location at which the transient merchant will offer a product, and wherein the geographic location corresponds to the user specified location.

10. The system of claim 7, wherein the search query includes a particular product.

11. The system of claim 7, wherein the transient merchant is capable of changing locations after a given time period.

12. A machine-readable medium embodying instructions that, when executed by a machine, cause the machine to perform operations comprising:

receiving a search query from a client device, the search query including a user specified location and a user specified time period, the search query being submitted via a first user interface presented on the client device;

identifying a transient merchant temporarily located within the user specified location at least during the user specified time period; and causing the client device to display a second user interface in response to receiving the search query submitted via the first user interface, the second user interface including:

an indicator displayed in conjunction with a map, the indicator indicating a temporary location of the transient merchant, the transient merchant being temporarily located within the user specified location during the user specified time period; and an indication of a number of matching different transient merchants where each of the matching different transient merchants are within a threshold distance of the user specified location.

13. The machine-readable medium of claim 12, wherein the user specified location is a specified distance from a current geographic location of the user.

14. The machine-readable medium of claim 12, wherein the transient merchant provides a geographic location at which the transient merchant will offer a product, and wherein the geographic location corresponds to the user specified location.

15. The machine-readable medium of claim 12, wherein the search query includes a particular product.

16. The machine-readable medium of claim 12, wherein the transient merchant is a food truck.

17. The machine-readable medium of claim 12, wherein the transient merchant is capable of changing locations after a given time period.

* * * * *